United States Patent
Yagyu et al.

(10) Patent No.: US 7,106,735 B2
(45) Date of Patent: Sep. 12, 2006

(54) MULTICAST PACKET TRANSFER SYSTEM IN WHICH MULTICAST PACKET IS TRANSMITTED AS UNICAST PACKET BETWEEN TRANSFER APPARATUSES

(75) Inventors: Tomohiko Yagyu, Tokyo (JP); Masahiro Jibiki, Tokyo (JP); Atsushi Iwata, Tokyo (JP)

(73) Assignee: NEC Corporation, Tokyo (JP)

( * ) Notice: Subject to any disclaimer, the term of this patent is extended or adjusted under 35 U.S.C. 154(b) by 840 days.

(21) Appl. No.: 09/793,638

(22) Filed: Feb. 27, 2001

(65) Prior Publication Data

US 2001/0026556 A1 Oct. 4, 2001

(30) Foreign Application Priority Data

Feb. 28, 2000 (JP) ............................ 2000/052444

(51) Int. Cl.
*H04L 12/56* (2006.01)
(52) U.S. Cl. ..................... 370/390; 370/401
(58) Field of Classification Search ............... 370/389, 370/392, 400, 401, 432
See application file for complete search history.

(56) References Cited

U.S. PATENT DOCUMENTS 5,956,335 A 9/1999 Backes et al.
6,259,701 B1* 7/2001 Shur et al. ................ 370/401
6,873,627 B1* 3/2005 Miller et al. .............. 370/466

FOREIGN PATENT DOCUMENTS

| EP | 0 598 969 | 6/1994 |
| EP | 0 902 569 | 3/1999 |
| JP | 62-56047 | 3/1987 |
| JP | 9-252319 | 9/1997 |
| JP | 10-93589 | 4/1998 |
| JP | 10-190663 | 7/1998 |
| JP | 2001-230774 | 8/2001 |

OTHER PUBLICATIONS

C. Perkins, "Ip Encapsulation Within IP", Oct. 1996, *IETF* RFC2003, pp. 1-14.

* cited by examiner

*Primary Examiner*—Derrick Ferris
(74) *Attorney, Agent, or Firm*—Young & Thompson (57) ABSTRACT

A multicast packet transfer system includes a first packet transfer apparatus and a second packet transfer apparatus. The first packet transfer apparatus transmits transfer packet data relating to an IP header and a UDP header of a multicast packet when the multicast packet is received, rewrites a header section of the multicast packet to produce a unicast packet, and transmits the unicast packet. The second packet transfer apparatus receives the transfer packet data and the unicast packet, and reproduces the multicast packet based on the received unicast packet and the received transfer packet data.

16 Claims, 4 Drawing Sheets

MULTICAST PACKET TRANSFER SYSTEM IN WHICH MULTICAST PACKET IS TRANSMITTED AS UNICAST PACKET BETWEEN TRANSFER APPARATUSES

BACKGROUND OF THE INVENTION

1. Field of the Invention

The present invention relates to a multicast packet transfer apparatus for receiving and transferring a multicast packet, a multicast packet transfer system and a computer-readable storage medium used in the multicast packet transfer apparatus.

2. Description of the Related Art

Figure 1:
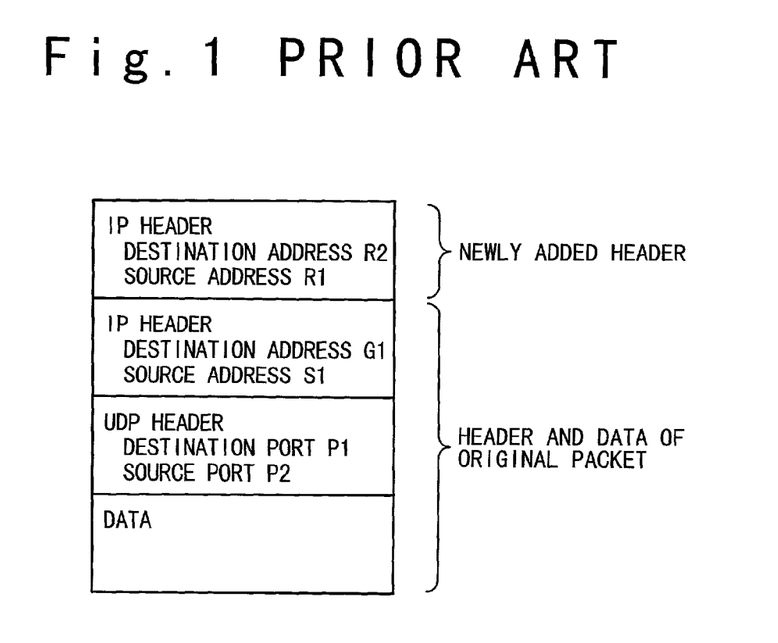
FIG. 1 is a block diagram showing a conventional encapsulated packet.

Conventionally, when a multicast packet is transferred to another address in a state of original packet data being held, the multicast packet is encapsulated to have a new header added to the header and data of the multicast packet, as shown in FIG. 1.

Such transfer of a multicast packet is described, for example, in "Ip Encapsulation within IP" by C. Perkins, (IETF RFC2003, Oct., 1996). However, when the packet is encapsulated as described above, the packet becomes longer by the length of a newly added header. Therefore, there is a problem that the packet becomes longer than the MTU of the media so that there is a possibility that the packet is fragmentized or divided.

In conjunction with the above description, a transfer system in a loop network system is disclosed in Japanese Laid Open Patent Application (JP-A-Showa 62-56047). In this reference, a reception address of a packet is divided into sub-addresses for a plurality of nodes, and each of the sub-addresses can be allocated with one of set and reset states. A packet transmission source node sets the sub-addresses for destination to the set state and the other sub-addresses to the reset state. After the sub-addresses in the set state are stored, a packet transmission is carried out. Each node transfers the received packet with no change when the sub-address of the received packet for the self node is in the reset state. Also, the node takes the received packet therein when the sub-address of the received packet for the self node is in the set state, and then outputs the packet after setting the sub-address of the received packet to the reset state. Thus, the node determines that data of the packet has been already received, when the packet travels on the loop and is received again.

Also, a packet transfer apparatus is disclosed in Japanese Laid Open Patent Application (JP-A-Heisei 9-252319). In this reference, when a multicast setting to a plurality of specific terminals is carried out in a lower layer, an address management section (103) generates an upper layer address corresponding to a lower layer multicast address and stores the upper layer address and the lower layer multicast addresses in an address table of a transfer control section (101). When receiving an upper multicast packet, the transfer control section (101) searches the address table for lower layer multicast addresses corresponding to the upper layer address and carries out multicast transmission to the specific terminals corresponding to the searched lower layer multicast addresses through a multicast communication interface section (102).

Also, a data unit which receives and distributes data packets from and to a packet switching circuit and a switching apparatus containing the data unit is disclosed in Japanese Laid Open Patent Application (JP-A-Heisei 10-93589). In this reference, a packet registration section (146) has reception queues (RQ0 to RQ63) corresponding to destinations of reception packets. The packet registration section (146) produces an entry corresponding to the packet in one reception queue (RQ) corresponding to the packet destination at the time of the packet reception. A multicast handling section (148) produces an entry corresponding to the packet in each reception queue of the packet registration means (146) corresponding to each destination in case of that the reception packet is a multicast packet having equal to or more than 2 destinations. A data unit contains a packet output section (150) which reads the packets in the order of production of the entries from the reception queues of a memory (24), to output to a packet switching circuit. An ATM switching apparatus uses the data unit, and a self routing switching device uses the ATM switching apparatus.

Also, a cell copy apparatus is disclosed in Japanese Laid Open Patent Application (JP-A-Heisei 10-190663). In this reference, a cell copy apparatus is used for an ATM switching and transmitting apparatus which transfers cells for a unicast call and multicast call, and copies the cell for a copy number contained in control data of the cell when the received cell is for the multicast call. The cell copy apparatus is composed of a unicast call buffer which temporarily stores a plurality of unicast cells, and a multicast call buffer temporarily stores a plurality of multicast call cells. A copy number extraction section extracts the number of copies from the control data of the received cell. A write control unit writes a cell in the unicast call buffer when the received cell is the unicast call cell, and writes the cell in the multicast call buffer when the received cell is the multicast call cell. A load observation control unit observes the load relating to the reception of the cells to determine input load. A read control unit reads out a cell selectively from the unicast call buffer or the multicast call buffer in accordance with the input load by the said load observation control unit. The delay of the unicast call cell can be reduced even if the spacing of the multicast call cell is carried out

SUMMARY OF THE INVENTION

Therefore, an object of the present invention is to provide a multicast packet transfer system in which no fragmentation may occur, and a method for the same.

Another object of the present invention is to provide a packet transfer apparatus which can be used for the above multicast packet transfer system.

Still another object of the present invention is to provide a multicast packet transfer system in which transmission resources can be effectively utilized.

In a first aspect of the present invention, a multicast packet transfer system includes a first packet transfer apparatus and a second packet transfer apparatus. The first packet transfer apparatus transmits transfer packet data relating to an IP header and a UDP header of a multicast packet when the multicast packet is received, rewrites a header section of the multicast packet to produce a unicast packet, and transmits the unicast packet. The second packet transfer apparatus receives the transfer packet data and the unicast packet, and reproduces the multicast packet based on the received unicast packet and the received transfer packet data.

The first packet transfer apparatus may include a transmitting section, a header rewriting section and a packet transferring section. The transmitting section produces the transfer packet data based on the received multicast packet to transmit to the second packet transfer apparatus. The header rewriting section rewrites the header section of the multicast packet based on the transfer packet data to produce the unicast packet. The packet transferring section transfers the unicast packet to the second packet transfer apparatus.

In this case, the transfer packet data may include the IP header and the UDP header of the received multicast packet and a number of a port of the first packet transfer apparatus corresponding to the IP header and the UDP header. In this case, the first packet transfer apparatus may further include a peer establishing section which establishes a peer relating to the port number with the second packet transfer apparatus. The packet transferring section transfers the unicast packet to the second packet transfer apparatus through the established peer.

Also, the first packet transfer apparatus may further include a first transfer packet data table which stores the transfer packet data. The header rewriting section searches the first transfer packet data table based on the IP header and the UDP header of the received multicast packet to retrieve the port number when the port number is registered in the first transfer packet data table in correspondence to the IP header and the UDP header, and rewrites the header section of the multicast packet using the port number to produce the unicast packet. The header rewriting section selects an unused port of the first packet transfer apparatus when any port number corresponding to the IP header and the UDP header of the received multicast packet is not searched, sets a number of the selected unused port as the port number, and stores the set port number in the first transfer packet data table in correspondence to the IP header and the UDP header.

Also, the second multicast packet transfer apparatus may include a second transfer packet data table, a data receiving section, a packet receiving section, and a reproducing section. The second transfer packet data table stores transfer packet data. The data receiving section receives the transfer packet data from the first packet transfer apparatus to store in the second transfer packet data table. The packet receiving section receives the unicast packet from the first packet transfer apparatus. The reproducing section retrieves the transfer packet data from the second transfer packet data table based on the header section of the unicast packet, and reproduces the received multicast packet using the retrieved transfer packet data. In this case, the transfer packet data may contains a number of a port of the first packet transfer apparatus through which the unicast data is transferred. The second packet transfer apparatus may further include a peer establishing section which establishes a peer relating to the port number with the first packet transfer apparatus. The packet receiving section receives the unicast packet from the first packet transfer apparatus through the established peer.

In a second aspect of the present invention, a packet transfer apparatus includes a transmitting section, a header rewriting section and a packet transferring section. The transmitting section produces transfer packet data relating to an IP header and a UDP header of a multicast packet when the multicast packet is received, and transfers the transfer packet data to another packet transfer apparatus. The header rewriting section rewrites the header section of the received multicast packet based on the transfer packet data to produce the unicast packet. The packet transferring section transfers the unicast packet to the another packet transfer apparatus.

The transfer packet data may includes the IP header and the UDP header of the received multicast packet and a number of a port of the first packet transfer apparatus corresponding to the IP header and the UDP header.

In this case, the packet transfer apparatus may further include a peer establishing section which establishes a peer relating to the port number with the another packet transfer apparatus. The packet transferring section transfers the unicast packet to the another packet transfer apparatus through the established peer.

In this case, the packet transfer apparatus may further include a transfer packet data table which stores the transfer packet data. The header rewriting section searches the transfer packet data table based on the IP header and the UDP header of the received multicast packet to retrieve the port number when the port number is registered in the transfer packet data table in correspondence to the IP header and the UDP header, and rewrites the header section of the multicast packet using the port number to produce the unicast packet.

Also, the header rewriting section selects an unused port of the first packet transfer apparatus when any port number corresponding to the IP header and the UDP header is not searched, sets a number of the selected unused port as the port number, and stores the set port number in the transfer packet data table in correspondence to the IP header and the UDP header.

In a third aspect of the present invention, a packet transfer apparatus includes a transfer packet data table, a data receiving section, a packet receiving section and a reproducing section. The transfer packet data table stores transfer packet data. The data receiving section receives the transfer packet data from another packet transfer apparatus to store in the transfer packet data table. The packet receiving section receives a unicast packet from the other packet transfer apparatus. The reproducing section retrieves the transfer packet data from the transfer packet data table based on the header section of the unicast packet, and reproduces an original multicast packet using the retrieved transfer packet data.

The transfer packet data may contain a number of a port of the other packet transfer apparatus through which the unicast data is transferred. The packet transfer apparatus may further include a peer establishing section which establishes a peer relating to the port number with the other packet transfer apparatus. The packet receiving section receives the unicast packet from the other packet transfer apparatus through the established peer.

In a fourth aspect of the present invention, a method of transferring a multicast packet between first and second packet transfer apparatuses as a unicast packet, is attained by (a) transmitting from the first packet transfer apparatus to the second packet transfer apparatus, transfer packet data relating to an IP header and a UDP header of a multicast packet when the multicast packet is received; by (b) rewriting a header section of the received multicast packet based on the transfer packet data to produce a unicast packet; by (c) transmitting the unicast packet from the first packet transfer apparatus to the second packet transfer apparatus; by (d) receiving second transfer packet data and a second unicast packet from the first packet transfer apparatus by the second packet transfer apparatus; and by (e) reproducing the multicast packet based on the unicast packet and the received transfer packet data in the second packet transfer apparatus.

In a fifth aspect of the present invention, a recording medium stores a program for executing a method by a packet transfer apparatus. The method is attained by (a) transmitting to a first packet transfer apparatus, first transfer packet data relating to an IP header and a UDP header of a first multicast packet when the first multicast packet is received; by (b) rewriting a header section of the first multicast packet based on the first transfer packet data to produce a first unicast packet; by (c) transmitting the first unicast packet to the first packet transfer apparatus; by (d) receiving second transfer packet data and a second unicast packet from a second packet transfer apparatus; and by (e) reproducing a second multicast packet based on the second unicast packet and the second transfer packet data.

The transfer packet data may include the IP header and the UDP header of the multicast packet and a port number of the packet transfer apparatus corresponding to the IP header and the UDP header.

In this case, a peer relating to the port number may be established with the first packet transfer apparatus to transfer the first unicast packet to the first packet transfer apparatus through the established peer.

Also, for the (b) rewriting step, a transfer packet data table may be searched based on the IP header and the UDP header of the first multicast packet to retrieve the port number when the port number is registered in the transfer packet data table in correspondence to the IP header and the UDP header, and the header section of the first multicast packet may be rewritten using the port number to produce the first unicast packet.

Also, for (b) rewriting, an unused port may be selected when any port number corresponding to the IP header and the UDP header is not searched, a number of the selected unused port may be set as the port number, and the set port number may be stored in the transfer packet data table in correspondence to the IP header and the UDP header of the first multicast packet.

Also, the (d) receiving step may be attained by storing the second transfer packet data in transfer packet data table, and the (e) reproducing may be attained by retrieving the second transfer packet data from the transfer packet data table based on the header section of the second unicast packet; and by reproducing an original multicast packet from the second unicast packet using the retrieved transfer packet data.

In this case, the second transfer packet data may contains a number of a port of the second packet transfer apparatus through which the second unicast data is transferred. In the method, a peer relating to the port number may be established with the second packet transfer apparatus to receive the second unicast packet from the second packet transfer apparatus through the established peer.

DESCRIPTION OF THE PREFERRED EMBODIMENTS

Hereinafter, a multicast packet transfer system of the present invention will be described with reference to the attached drawings.

Figure 2:
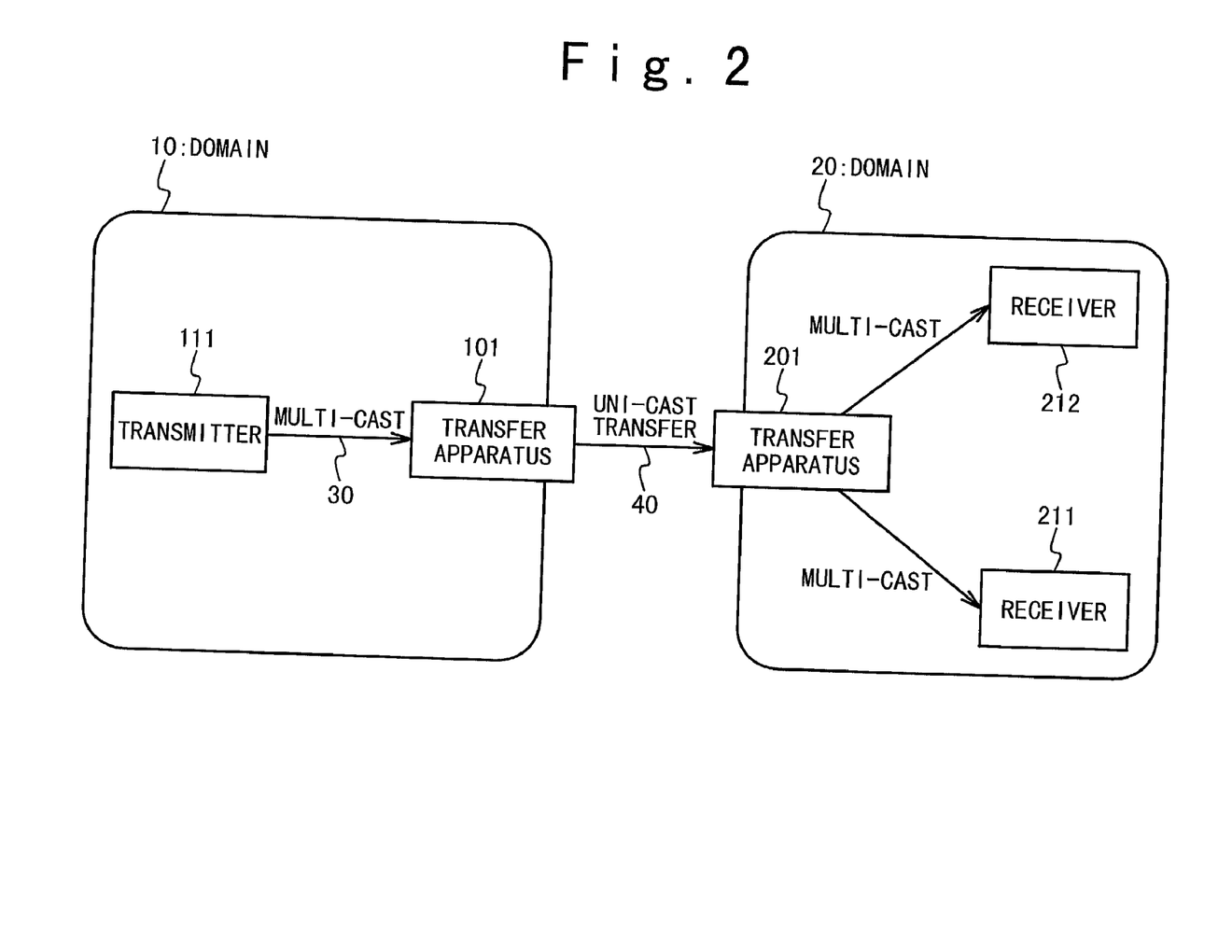
FIG. 2 is a block diagram showing a multicast packet transfer system according to an embodiment of the present invention.

FIG. 2 shows a multicast packet transfer system using packet transfer apparatuses according to one embodiment of the present invention. Referring to FIG. 2, multicast route control domains (hereinafter, to be referred to as domains) 10 and 20 are domains managed by means of a multicast routing protocol. There exists a sender 111 of a multicast group G1 in the domain 10, and there exist receivers 211 and 212 of a multicast group G1 in the domain 20.

A transfer apparatus 101 is located in the domain 10, and a transfer apparatus 201 is located in the domain 20. The transfer apparatuses 101 and 201 are set in such a manner that they establish a transfer relation (hereinafter, to be referred to as a peer).

Each transfer apparatus, the sender and the receivers have addresses, respectively. Here, it is supposed that the address of the transfer apparatus 101 is R1, the address of the transfer apparatus 201 is R2, the address of the sender 111 is S1, the address of the receiver 211 is V1 and the address of the receiver 212 is V2.

Figure 3:
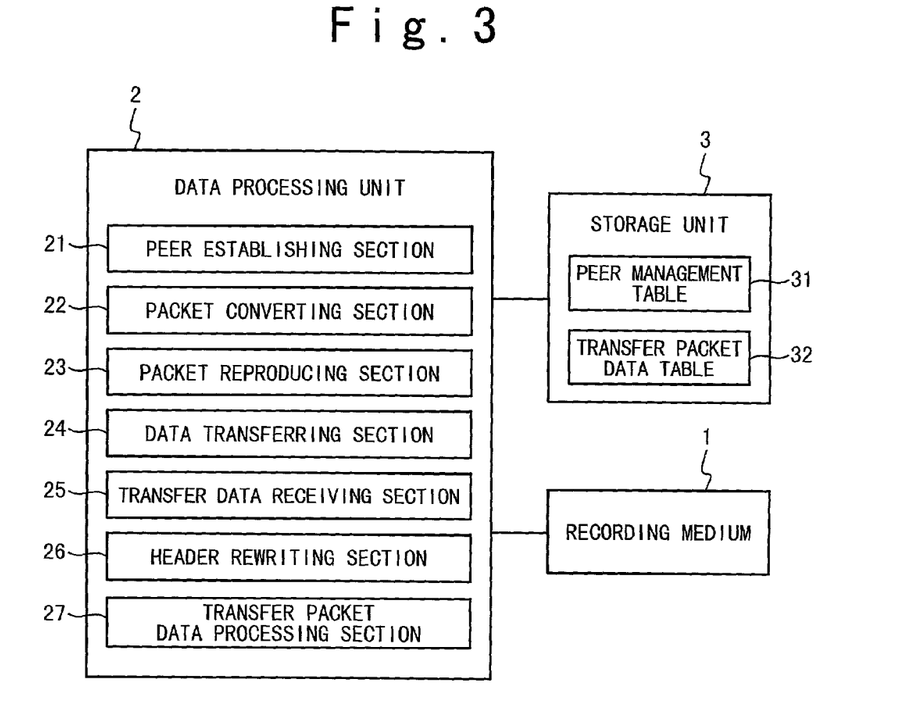
FIG. 3 is a block diagram showing the structure of a multicast packet transfer apparatus according to the embodiment of the present invention.

FIG. 3 shows the internal structure of one packet transfer apparatus.

The packet transfer apparatus is composed of a recording medium 1 in which a packet transfer program and a header rewrite program are recorded, a data processing unit 2 and a storage unit 3. The programs recorded in the recording medium 1 are read into the data processing unit 2 for controlling the operation thereof. The recording medium 1 is a computer-readable storage medium according to the present invention. As this storage medium, various kinds of disk media and magnetic recording medium, semiconductor memories and the like can be used.

The storage unit 3 stores a peer management table 31 which stores peers established with other packet transfer apparatuses and a transfer packet data table 32 which stores transfer packet data. The tables 31 and 32 are updated by the data processing unit 2.

The data processing unit 2 is composed of a peer establishing section 21, a packet converting section 22, a packet reproducing section 23, a data transferring section 24, a transfer data receiving section 25, a header rewriting section 26, and a transfer packet data processing section 27.

In FIG. 2, the packet transfer apparatus 101 and 201 establish a peer and confirm the operation thereof by the peer establishing sections 21. A confirmation packet is transmitted periodically between them. The packet transfer apparatus 101 and the packet transfer apparatus 201 manage the peers by means of the peer management table 31, respectively. In the peer management table 31, data such as ports used for transferring a packet through each peer, groups and transmitters permitted to transfer a packet, fee charging data, communication quality data are registered.

Figure 4:
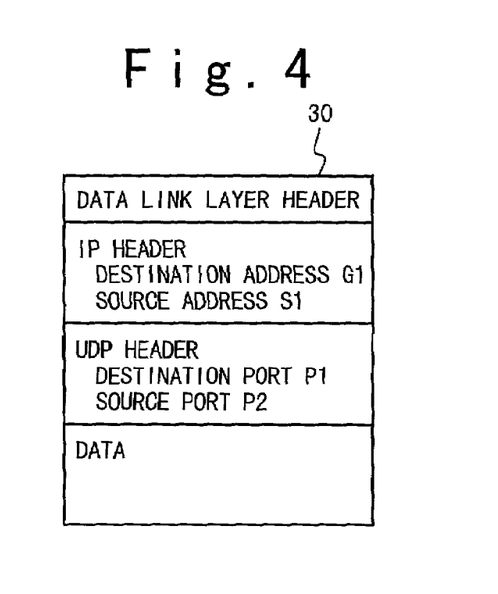
FIG. 4 is a block diagram showing a transferred multicast packet.

The packet transfer apparatus 101 and 201 operate as receivers of a multicast group respectively in accordance with the data stored in the peer management table 31 at the time of start. A sender 111 transmits a multicast packet 30 to the multicast packet group G1. FIG. 4 shows the structure of the multicast packet 30. Referring to FIG. 4, the multicast pack is composed of a header section of an IP header and a UDP header and a data. In the IP header, a group (destination) address G1 and a source (origination point) address S1 are written, and in the UDP header, a destination port P1 and a source (origination point) port P2 are written.

The multicast packet 30 is transmitted from the sender 111 to the packet transfer apparatus 101 via a multicast route in the domain 10. The packet transfer apparatus 101 receives the packet 30 by the transfer data receiving section 25 and refers to the peer management table 31 by the packet converting section 22 to determine to which peer the packet 30 is to be transferred. In this example, a port number P3 is retrieved from the peer management table 31 as a port number of the packet transfer apparatus 201.

When there is a peer to which the packet 30 is to be transferred, the packet transfer apparatus 101 next searches its own transfer packet data table 32 by the transfer packet data processing section 27 based on the destination address G1, the source address S1, the destination port P1 and a source port P2 of the IP header and the UDP header in the packet 30. Thus, a number of a port of the packet transfer apparatus 101 to be used to transfer the packet is determined, if an entry is searched. In this example, the port number P4 is searched. When no entry is found in the transfer packet data table 32, a currently unused port number is acquired. The transfer packet data processing section 27 stores the acquired port number in the transfer packet data table 32 in correspondence to the destination address G1, the source address S1, the destination port P1 and a source port P2 of the IP header and the UDP header in the packet 30. Also, the packet converting section 22 searches the peer management table 31 to determine the peer and the destination port of the packet transfer apparatus 201. If the peer for the port number P4 is not yet established, the peer establishing section 21 establishes a new peer and stores in the peer management table 31.

Then, the data transferring section 24 sends transfer packet data to the packet transfer apparatus 201 through the established peer. At this time, the transfer packet data is composed of

| | |
|---|---|
| destination (group) address | G1 |
| destination port | P1 |
| source (originator point) address | S1 |
| source (source point) port | P2 |
| source port | P4. |

The packet transfer apparatus 201 receives the sent transfer packet data by the transfer data receiving section 25 and the transfer packet data processing section 27 registers the transfer packet data in its own transfer packet data table 32.

After having sent the transfer packet data, the header rewriting section 26 of the packet transfer apparatus 101 rewrites the header of the multicast packet based on the transfer packet data, to produce a unicast packet.

Figure 5:
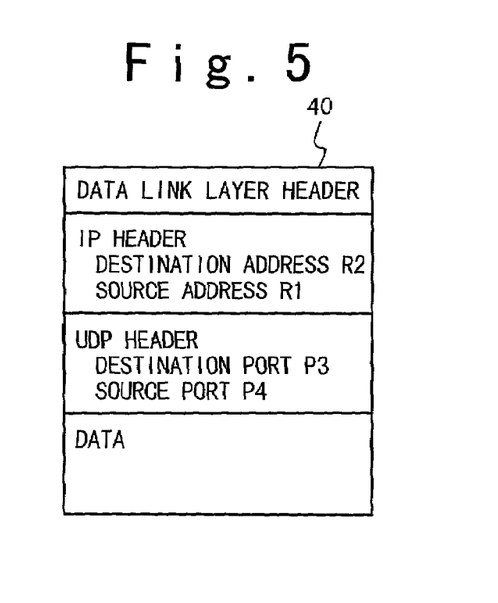
FIG. 5 is a block diagram showing a unicast packet produced from the multicast packet.

FIG. 5 shows the structure of a unicast packet or 40 in which the header of the multicast packet has been rewritten. The unicast packet 40 is composed of a header section and a data section. The header section is composed of an IP header of a destination address R2 and a source (origination point) address R1, and a UDP header of a destination port P3 and a source port P4. The above-described destination port P3 is different from the destination port P1 of FIG. 4. The peer relating to the port P3 is exchanged in advance between the packet transfer apparatus 101 and 201 and is recorded in the peer management table 31.

The unicast packet 40 is transmitted to the packet transfer apparatus 201 by the data transferring section 24. When receiving the unicast packet 40 with the destination port P3 from the packet transfer apparatus 101, the packet transfer apparatus 201 determines that the unicast packet 40 is a packet for a multicast packet. The transfer packet data processing section 27 of the packet transfer apparatus 201 searches the transfer packet data table 32 based on the transfer source port P4 of the received packet 40, and retrieves the group address G1, the destination port P1, the source address S1 and the source port P2 of the original multicast packet. The packet reproducing section 23 of the packet transfer apparatus 201 reproduces the original multicast packet 30 based on the retrieved transfer packet data.

Subsequently, the packet transfer apparatus 201 transmits the reproduced original multicast packet 30 to the receiver 211 and 212 in its own domain 20. Thus, the multicast packet transmitted from the transmitter 111 is received by the receivers 211 and 212 through the packet transfer apparatuses 101 and According to the present invention, since no encapsulation is required in transferring a multicast packet, fragmentation can be prevented.

What is claimed is:

1. A multicast packet transfer system comprising:
    a first packet transfer apparatus which transmits transfer packet data relating to an IP header and a UDP header of a multicast packet when said multicast packet is received, rewrites a header section of said multicast packet to produce a unicast packet, and transmits said unicast packet; and
    a second packet transfer apparatus which receives said transfer packet data and said unicast packet, and reproduces said multicast packet based on the received unicast packet and the received transfer packet data, wherein,
    said first packet transfer apparatus comprises
    i) a transmitting section which produces said transfer packet data based on the received multicast packet to transmit to said second packet transfer apparatus,
    ii) a header rewriting section which rewrites said header section of said multicast packet based on said transfer packet data to produce said unicast packet,
    iii) a packet transferring section which transfers said unicast packet to said second packet transfer apparatus, and
    iv) a first transfer packet data table which stores said transfer packet data,
    said transfer packet data includes said IP header and said UDP header of the received multicast packet and a number of a port of said first packet transfer apparatus corresponding to said IP header and said UDP header,
    said header rewriting section searches said first transfer packet data table based on said IP header and said UDP header of the received multicast packet to retrieve said port number when said port number is registered in said first transfer packet data table in correspondence to said IP header and said UDP header, and rewrites said header section of said multicast packet using said port number to produce said unicast packet, and
    said header rewriting section selects an unused port of said first packet transfer apparatus when any port number corresponding to said IP header and said UDP header of the received multicast packet is not searched, sets a number of the selected unused port as said port number, and stores the set port number in said first transfer packet data table in correspondence to said IP header and said UDP header.

2. The multicast packet transfer system according to claim 1, wherein said first packet transfer apparatus further comprises:
    a peer establishing section which establishes a peer relating to said port number with said second packet transfer apparatus, and
    wherein said packet transferring section transfers said unicast packet to said second packet transfer apparatus through said established peer.

3. The multicast packet transfer system according to claim 1, wherein said second multicast packet transfer apparatus comprises:

a second transfer packet data table which stores transfer packet data;

a data receiving section which receives said transfer packet data from said first packet transfer apparatus to store in said second transfer packet data table;

a packet receiving section which receives said unicast packet from said first packet transfer apparatus; and a reproducing section which retrieves the transfer packet data from said second transfer packet data table based on said header section of said unicast packet, and reproduces said received multicast packet using said retrieved transfer packet data.

4. The multicast packet transfer system according to claim 3, wherein said transfer packet data contains a number of a port of said first packet transfer apparatus through which said unicast data is transferred, and said second packet transfer apparatus further comprises:

a peer establishing section which establishes a peer relating to said port number with said first packet transfer apparatus, and wherein said packet receiving section receives said unicast packet from said first packet transfer apparatus through said established peer.

5. A packet transfer apparatus comprising:

a transmitting section which produces transfer packet data relating to an IP header and a UDP header of a first multicast packet when said first multicast packet is received, and transmits said transfer packet data to another packet transfer apparatus;

a header rewriting section which rewrites said header section of said received first multicast packet based on said transfer packet data to produce a unicast packet; and a packet transferring section which transmits said unicast packet to said another packet transfer apparatus;

a data receiving section which i) receives transfer packet data and unicast packets from said another packet transfer apparatus, the received transfer packet data relating to an IP header and a UDP header of a second multicast packet received by the transmitting multicast packet, and ii) reproduces the second multicast packet based on the received unicast packet and the received transfer packet data, wherein, said transfer packet data includes said IP header and said UDP header of said first received multicast packet and a number of a port of said first packet transfer apparatus corresponding to said IP header and said UDP header;

a peer establishing section which establishes a peer relating to said port number with said another packet transfer apparatus, wherein said packet transferring section transfers said unicast packet to said another packet transfer apparatus through said established peer;

a transfer packet data table which stores said transfer packet data, wherein, said header rewriting section searches said transfer packet data table based on said IP header and said UDP header of said received first multicast packet to retrieve said port number when said port number is registered in said transfer packet data table in correspondence to said IP header and said UDP header, and rewrites said header section of said first multicast packet using said port number to produce said unicast packet, and said header rewriting section selects an unused port of said first packet transfer apparatus when any port number corresponding to said IP header and said UDP header is not searched, sets a number of the selected unused port as said port number, and stores said set port number in said transfer packet data table in correspondence to said IP header and said UDP header.

6. The packet transfer apparatus of claim 5, further comprising:

a transfer packet data table which stores transfer packet data, the data receiving section storing said received transfer packet data from the another packet transfer apparatus in said transfer packet data table; and a reproducing section which retrieves the received transfer packet data from said transfer packet data table based on said header section of said received unicast packet, and reproduces the second multicast packet using said retrieved transfer packet data.

7. The packet transfer apparatus according to claim 6, wherein said received transfer packet data containing a number of a port of said another packet transfer apparatus through which said unicast data is transferred, and said packet transfer apparatus further comprises:

a peer establishing section which establishes a peer relating to said port number with said another packet transfer apparatus, and wherein said packet receiving section receives said unicast packet from said another packet transfer apparatus through said established peer.

8. A recording medium storing a program for executing a method of transferring a multicast packet between first and second transfer apparatuses as a unicast packet, wherein said method comprises the steps of:

(a) transmitting from a first packet transfer apparatus to a second packet transfer apparatus, first transfer packet data relating to an IP header and a UDP header of a first multicast packet when said first multicast packet is received;

(b) rewriting a header section of said first multicast packet based on said first transfer packet data to produce a first unicast packet;

(c) transmitting said first unicast packet from said first packet transfer apparatus to said second packet transfer apparatus;

(d) receiving second transfer packet data and a second unicast packet from said first packet transfer apparatus by said second packet transfer apparatus; and (e) reproducing a second multicast packet based on said second unicast packet and said second transfer packet data, wherein, said first transfer packet data includes said IP header and said UDP header of said received first multicast packet and a port number of said first packet transfer apparatus corresponding to said IP header and said UDP header, said (b) rewriting step comprises the step of searching a transfer packet data table based on said IP header and said UDP header of said first multicast packet to retrieve said port number when said port number is registered in said transfer packet data table in correspondence to said IP header and said UDP header, rewriting said header section of said first multicast packet using said port number to produce said first unicast packet, and selecting an unused port when any port number corresponding to said IF header and said UDP header is not searched, setting a number of the selected unused port as said port number, and storing said set port number in said transfer packet data table in correspondence to said IF header and said UDP header of said first multicast packet.

9. The recording medium according to claim 8, wherein said method further comprises the step of:
establishing a peer relating to said port number with said second packet transfer apparatus to transfer said first unicast packet to said second packet transfer apparatus through said established peer.

10. The recording medium according to claim 8, wherein said (d) receiving step comprises the step of:
storing said second transfer packet data in transfer packet data table, and
wherein said (e) reproducing step comprises the step of:
retrieving said second transfer packet data from said transfer packet data table based on said header section of said second unicast packet; and
reproducing an original multicast packet from said second unicast packet using said retrieved transfer packet data.

11. The recording medium according to claim 10, wherein said second transfer packet data contains a number of a port of said first packet transfer apparatus through which said second unicast data is transferred, and
wherein said method further comprises the step of:
establishing a peer relating to said port number with said first packet transfer apparatus to receive said second unicast packet from said first packet transfer apparatus through said established peer.

12. A multicast packet transfer system, comprising:
a sender transmitter (111) of a first multicast group, having a group destination address (G1) and located in a first domain (10), and plural receivers (211, 212) of the first multicast group located in a second domain (20), the sender transmitter (111) having a sending address (Sl),
the sender transmitter (111) transmitting an original multicast packet (30) to the plural receivers, the original multicast packet comprising an IP header, a UDP header, and a data section, the IP header comprising a destination address field and a source address field, the UDP header comprising a destination port field and a source port field;
a first transfer apparatus (101) in a peer relation with a second transfer apparatus (201), the first transfer apparatus having a first transfer address (R1) and the second transfer apparatus having a second transfer address (R2),
the original multicast packet transmitted from the sender transmitter to the first transfer apparatus, the first transfer apparatus reconfiguring the received original multicast packet into a unicast packet (40) and transferring the unicast packet to the second transfer apparatus, the second transfer apparatus reproducing the original multicast packet from the received unicast packet and transferring the reproduced original multicast packet to the plural receivers;
the first and second transfer apparatuses each comprising a peer management table (31) storing peers established with other packet transfer apparatuses and a transfer packet data table (32) storing transfer packet data,
the peer management table comprising data registering ports used for transferring a packet through each transfer apparatus, ports used for transferring the packet through the multi cast group, and transmitters permitted to transfer the packet,
a peer relationship between the first transfer apparatus and the second transfer apparatus maintained by the peer management table of each of the first and second transfer apparatuses, respectively, wherein,
the sender transmitter, in sending in the multicast packet, writes i) the group destination address (G1) in the destination address field, ii) the sending address (S1) in the source destination field, iii) a destination port (P1) corresponding to an incoming port of the first transfer apparatus in the destination port field, and iv) a source port (P2) corresponding to an outgoing port of the sender transmitter in the source port field,
the first transfer apparatus upon receiving the sent multicast packet, i) refers to the peer management table to determine a receiving port number (P3) of the second transfer apparatus to which the received multicast packet is to be transferred as the unicast packet, ii) determines, by searching the transfer packet data table, a current outgoing transfer port (P4) of first transfer apparatus for transferring the unicast packet to the second transfer apparatus, iii) upon determining there is no current outgoing transfer port, assigning an unused port number as the outgoing transfer port (P4) and storing the assigned unused port in the transfer packet data table as the outgoing transfer port, iv) sends updated transfer packet data for registering in the transfer packet data table of the second transfer apparatus, the updated transfer packet data comprising the group destination address (G1), the destination port (P1) corresponding to the incoming port of the first transfer apparatus (101), the source port (P2) corresponding to the outgoing port of the sender transmitter (111), and the outgoing transfer port (P4) of first transfer apparatus (101), and v) reconfigures the received original multicast packet into the unicast packet for transfer to the second transfer apparatus, by
in the destination address field, replacing the group destination address (G1) with the second transfer address (R2) of the second transfer apparatus (201),
in the source destination field, replacing the sending address (S1) with the first transfer address (R1) of the first transfer apparatus (101),
in the destination port field, replacing the destination port (P1) corresponding to the incoming port of the first transfer apparatus (101) with the receiving port number (P3) of the second transfer apparatus (201), and
in the source port field, replacing the source port (P2) corresponding to the outgoing port of the sender transmitter (111) with the outgoing transfer port (P4) of first transfer apparatus (101), and
the second transfer apparatus, upon receiving the unicast packet, reproduces the original multicast packet from the received unicast packet by rewriting i) the group destination address (G1) in the destination address field, ii) the sending address (S1) in the source destination field, iii) the destination port (P1) corresponding to an incoming port of the first transfer apparatus (101) in the destination port field, and iv) the source port (P2) corresponding to an outgoing port of the sender transmitter (111) in the source port field.

13. A multicast packet transfer system, comprising:
a sender transmitter (111) which transmits an original multicast packet (30) to plural receivers (211, 212) via a first transfer apparatus (101) located in a first domain (10) and a second transfer apparatus (201) located in a second domain (20),
the original multicast packet comprising an IP header, a UDP header, and a data section, the IP header comprising a destination address field and a source address field, the UDP header comprising a destination port field and a source port field, the original multicast packet transmitted from the sender transmitter to the first transfer apparatus, the first transfer apparatus reconfiguring the received original multicast packet into a unicast packet (40) and transferring the unicast packet to the second transfer apparatus, the second transfer apparatus reproducing the original multicast packet from the received unicast packet and transferring the reproduced original multicast packet to the plural receivers, the first and second transfer apparatuses each comprising a transfer packet data table (32) storing transfer packet data, the sender transmitter, in sending in the original multicast packet, writes i) the group destination address (G1) in the destination address field, ii) a sending address (S1) of the sender transmitter in the source destination field, iii) a destination port (P1) corresponding to an incoming port of the first transfer apparatus in the destination port field, and iv) a source port (P2) corresponding to an outgoing port of the sender transmitter in the source port field, the first transfer apparatus upon receiving the original multicast packet i) sends update transfer packet data for registering in the transfer packet data table of the second transfer apparatus, the update transfer packet data comprising the group destination address (G1), the destination port (P1) corresponding to the incoming port of the first transfer apparatus (101), the source port (P2) corresponding to the outgoing port of the sender transmitter (111), and an outgoing transfer port (P4) of first transfer apparatus (101), and ii) reconfigures the received original multicast packet into the unicast packet by in the destination address field, replacing the group destination address (G1) with a transfer address (R2) of the second transfer apparatus (201), in the source destination field, replacing the sending address (S1) with a transfer address (R1) of the first transfer apparatus (101), in the destination port field, replacing the destination port (P1) corresponding to the incoming port of the first transfer apparatus (101) with a receiving port number (P3) of the second transfer apparatus (201), and in the source port field, replacing the source port (P2) corresponding to the outgoing port of the sender transmitter (111) with the outgoing transfer part (P4) of first transfer apparatus (101), and the second transfer apparatus, upon receiving the unicast packet, reproduces the original multicast packet from the received unicast packet.

14. The system of claim 13, wherein, the first and second transfer apparatuses each further comprises a peer management table (31) storing peers established with other packet transfer apparatuses, the first transfer apparatus upon receiving the multicast packet further iii) refers to the peer management table to determine the receiving port number (P3) of the second transfer apparatus to which the received multicast packet is to be transferred as the unicast packet, iv) determines, by searching the transfer packet data table, a current outgoing transfer port (P4) of first transfer apparatus for transferring the unicast packet to the second transfer apparatus, v) upon determining there is no current outgoing transfer port, assigning an unused port number as the outgoing transfer port (P4) and storing the assigned unused port in the transfer packet data table as the outgoing transfer port, and the second transfer apparatus (201), upon receiving the unicast packet, reproduces the original multicast packet from the received unicast packet by rewriting i) the group destination address (G1) in the destination address field, ii) the sending address (S1) in the source destination field, iii) the destination port (P1) corresponding to an incoming port of the first transfer apparatus (101) in the destination port field, and vi) the source port (P2) corresponding to an outgoing port of the sender transmitter (111) in the source port field.

15. The system of claim 13, wherein, said first transfer apparatus comprises i) a transmitting section which produces said transfer packet data based on the received original multicast packet to transmit to said second transfer apparatus, ii) a header rewriting section which rewrites said IP and UDP headers of said original multicast packet based on said transfer packet data to produce said unicast packet, and iii) a packet transferring section which transfers said unicast packet to said second transfer apparatus.

16. The system of claim 15, wherein, said transfer packet data of said first transfer apparatus includes said IP header and said UDP header of the received original multicast packet and a number of the source port (P2) corresponds to the outgoing port of the sender transmitter, the outgoing transfer port (P4) of said first transfer apparatus corresponds to said IP header and said UDP header, said header rewriting section searches said transfer packet data table based on said IP header and said UDP header of the received original multicast packet to retrieve said outgoing transfer port number when said outgoing transfer port number is registered in said first transfer packet data table, and rewrites said header section of said multicast packet using said outgoing transfer port number to produce said unicast packet, and said header rewriting section selects an unused port of said first transfer apparatus when the search does not find any outgoing transfer port number corresponding to said IP header and said UDP header, sets a number of the selected unused port as said outgoing transfer port number, and stores the set port number in said transfer packet data table in correspondence to said IP header and said UDP header.

* * * * *